R. G. FINLAY.
PROCESS FOR SECURING HEAT ENERGY FROM COMBUSTIBLE SUBSTANCES.
APPLICATION FILED AUG. 5, 1913.
1,213,470.
Patented Jan. 23, 1917.
2 SHEETS—SHEET 1.
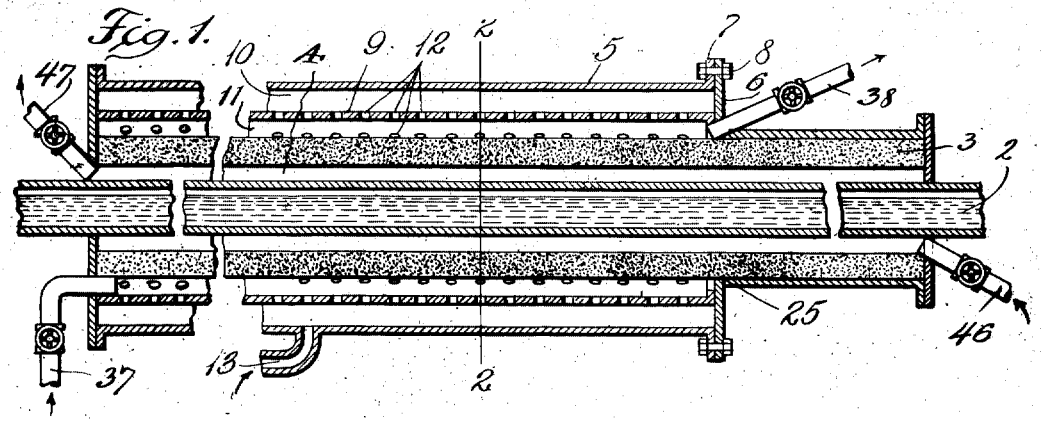
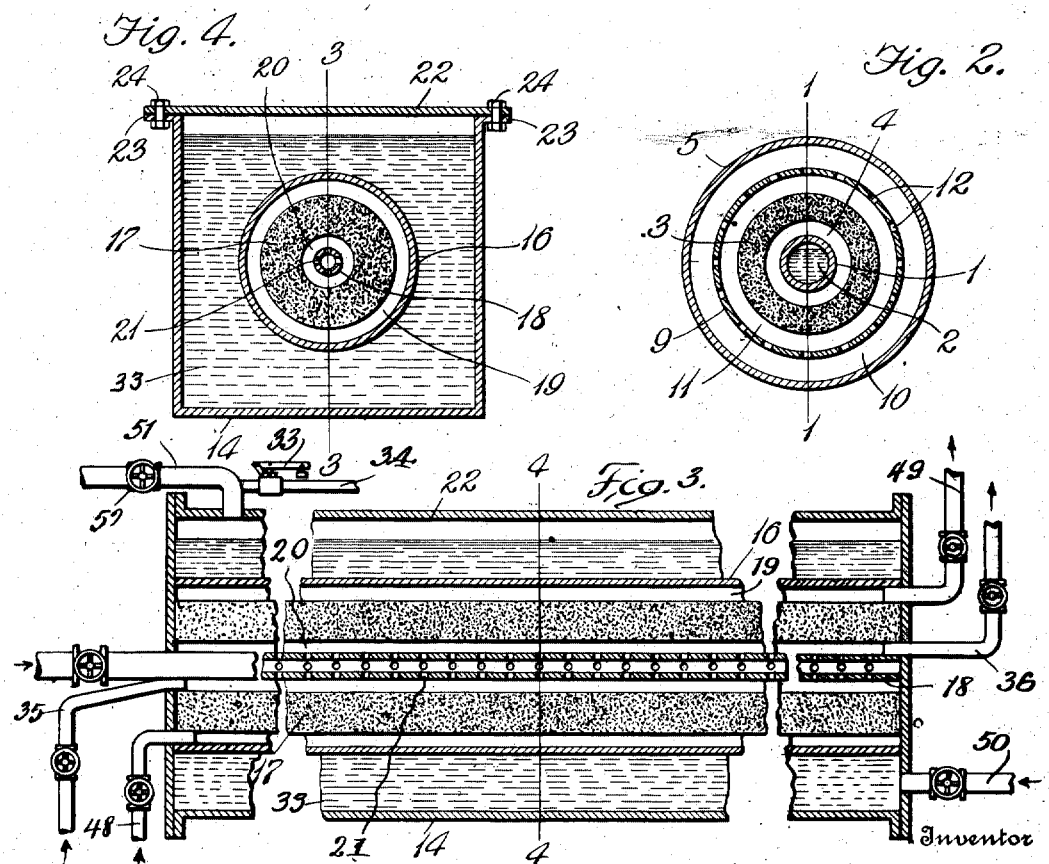
Witnesses
Chas. W. Stauffiger
Adrian K. Aukens
Inventor
Robert Gilmour Finlay,
By Henry S. Blackmore
Attorney R. G. FINLAY.
PROCESS FOR SECURING HEAT ENERGY FROM COMBUSTIBLE SUBSTANCES.
APPLICATION FILED AUG. 5, 1913.
1,213,470.
Patented Jan. 23, 1917.
2 SHEETS—SHEET 2.
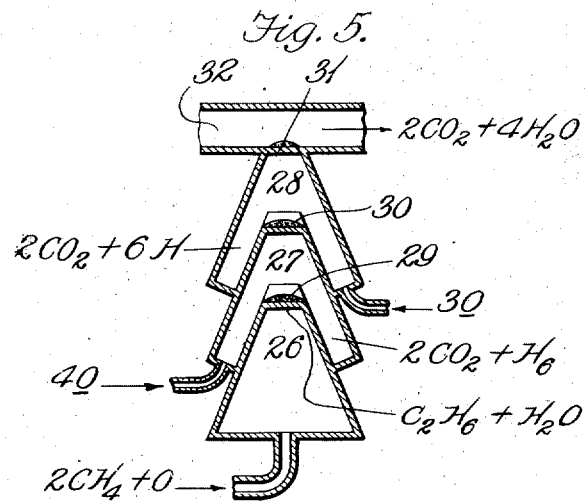
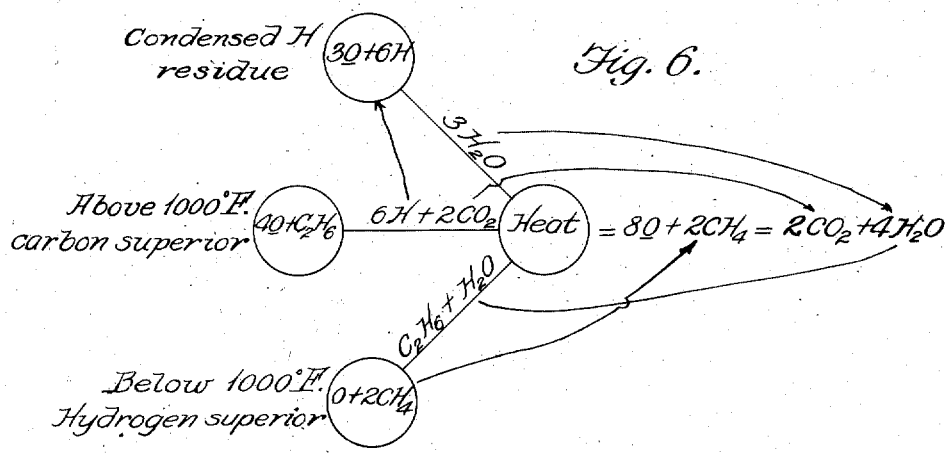
Inventor
Robert Gilmour Finlay,
Witnesses
Chas W. Stauffiger.
Adrian K. Aukens
By Henry S. Blackmore.
Attorney

UNITED STATES PATENT OFFICE.

ROBERT GILMOUR FINLAY, OF CLEVELAND, OHIO.

PROCESS FOR SECURING HEAT ENERGY FROM COMBUSTIBLE SUBSTANCES.

1,213,470.  Specification of Letters Patent.  Patented Jan. 23, 1917.

Application filed August 5, 1913. Serial No. 783,230.

*To all whom it may concern:*

Be it known that I, ROBERT GILMOUR FINLAY, a citizen of the United States, residing at No. 2330 Euclid avenue, in the city of Cleveland, county of Cuyahoga, State of Ohio, have invented certain new and useful Improvements in Processes for Securing Heat Energy from Combustible Substances, of which the following is a specification.

This invention relates to processes for securing and delivering heat energy from combustible fluids and the transformation of such heat energy into chemical, physical, or mechanical products and has for its object the conversion of combustible substances into by-products in such a manner that larger yields of available heat are obtained and secured or applied from given amounts of combustible substances than by processes and means employed hitherto and the conversion of such heat into products, and it comprises exposing combustible fluids in a comminuted or finely divided state to the action of a combustion inducing means, such as heat or other means of ignition, either *per se* or augmented by contact or catalytic agents and in the presence of a substance having an affinity for hydrogen capable of retaining or anchoring it from and against circulating gases, but capable of delivering it to oxygen when present in sufficient proportion to combust the same and a heat absorbing and radiating substance broadly and of a heat non-conductive and heat diffusive character specifically, and applying and delivering the heat so formed to a substance or through a medium whereby the heat energy may be secured as power or other product yielded, by the heat transformation either chemically or physically.

The invention is based on the principle of concentrated combustion of restricted combustible substances associated with substances capable of securing and delivering the heat energy evolved during combustion, which substances are preferably of solid nature, and includes the application or utilization of the condensing, contact, or attractive action of certain materials for hydrogen gas whereby ordinarily fugitive hydrogen, which is evolved when hydrocarbon is dissociated by heat or combusted with oxygen at a temperature selective to the combustion of the carbon content, viz., above 1000 degrees F., whereby hydrogen is liberated and escapes uncombusted is secured or if combusted it is at points not available for securing the heat evolved, and particularly when oxygen in the combustion gases is deficient or so increasingly diluted with inert gases, such as nitrogen as is the case when air is deoxygenated during the combustion process, as to be non-available.

It is well known that certain substances, such as platinum, palladium, clay, silica and other substances have such an attractive affinity for hydrogen that they condense it upon their surfaces and occlude it within their porous bodies in large volumes and quantities and to an increased gravity or density by their peculiar inherent physical properties and hence in the present invention these substances are employed for the purpose of holding, retaining, or anchoring uncombusted hydrogen liberated or otherwise associated with the combustion fluids during the process of combustion and preventing it from escaping uncombusted in and with the products of combustion and thereby separating it from inert incombustible fluids or other fluids not entering into the combustion or the combusted products, thereby enabling its combustion to take place at points available for heat recovery in its application for utilizable purposes, and, particularly through the agency of the associated heat absorbing and radiating material, thus increasing the initial heat energy evolved and providing for its direct utilization through other and more positive means than convection, diffusion or circulation of heated gases or gaseous products of combustion, the solid heat absorbers and radiators being of superior heat storing and delivering capacity and nature than the non-conductive gaseous products of combustion of the prior art.

As an example of the process and manner and means by which it is performed the oxidative combustion of hydrocarbon and conversion of the energy evolved into power through the medium of water or steam, and means for supplying power will be given, reference being directed to the accompanying drawings which represent diagrammatically a means employed to accomplish the desired result in which:—

Figure 1. is a broken sectional view of an apparatus adapted for heating fluid from the outside inward, in accordance with the present invention, and on the line 1—1 Fig. 2. Fig. 2 is a cross section of the same on the line 2—2 of Fig. 1, Fig. 3 is a broken sectional view of an apparatus adapted for heating fluid from the inside outward, and on the line 3—3 Fig. 4, Fig. 4 is a cross section of the same on the line 4—4 Fig. 3, Fig. 5 is an analytical diagrammatic view and legend illustrative of the various steps involved in oxygenated combustion of hydrocarbon at various temperatures of progressive nature with limited and regulated portions of oxygen at various points or in a plurality of combustion zones or planes, and Fig. 6 illustrates diagrammatically and by legend the various steps involved in the oxygenated combustion of constituents of hydrocarbon in composite character concentrating in a common delivery of heat evolved at each stage resulting in ultimate or complete combustion.

Similar numerals of reference designate corresponding parts in the several views.

Referring to Figs. 1 and 2, the numeral 1 indicates a pipe or conduit containing fluid 2 to be heated. Surrounding the pipe or conduit 1 is the porous tube or member 3 of refractory material having the property of condensing or occluding hydrogen and of sufficient internal diameter to provide an annular combustion chamber or space 4 between its inner surface and the exterior of the pipe or conduit 1. This section of the apparatus is housed by the exterior shell or housing 5 closed at the ends by suitable blank flanges 6 engaging the flanges 7 of the housing 5 and secured thereto in a closing fashion by the bolts 8, the blank flange 6 being provided with a circular opening 25 adapted to fit closely about the porous hydrogen condenser tube 3. Inside the housing 5 is situated a perforated or foraminous tube or member 9 in such a manner as to be located between the inner surface of the housing 5 and the outer surface of the porous hydrogen condenser 3 as to form a mixing and diffusing chamber 10 for the combustible fluid ingredients and the preliminary or primary combustion chamber 11, the two being closed at the ends by contact engagement of the perforated tube 9 with the inner side of the flange closure 6 and is provided with the openings or perforations 12 through which the combustible gases or fluids are fed to the preliminary or primary combustion chamber 11. The housing 5 is provided with the inlet 13 for the combustible fluids which are supplied to the mixing chamber 10 and from thence the combustible fluids are uniformly supplied to the preliminary or primary chamber 11 through the perforations or openings 12. In the operation of this form of heater the combustible fluid, such as a mixture of methane and air or oxygen or substance containing the same comprising natural gas and air or oxygen or other hydrocarbon, is supplied to the mixing chamber 10 through the inlet 13 and it passes thence to the preliminary or primary combustion chamber 11 where it is ignited and a part burned therein, thereby heating the porous hydrogen condenser tube 3 exteriorly, which porous tube or member comprises preferably clay or clay augmented in its hydrogen condensing contact action by platinum or other similarly acting substance and constitutes a very porous material capable of admitting of the ready passage of the combustion gases, absorbing the heat evolved and radiating it gradually or otherwise supplying it to the pipe or conduit 1 or other device or receptacle containing the fluid or other substance to be heated 2.

As the combustion proceeds in chamber 11 the heat accumulates therein until a temperature of 1000 degrees F. is quickly reached at which oxygen has a superior affinity for carbon over hydrogen and, therefore, primarily combusts the same in preference to the hydrogen of hydrocarbon and liberates free hydrogen which passes with the products of combustion into and through the interstices of the tube 3 into the secondary combustion chamber 4 where the hydrogen which has been left uncombusted in chamber 11 and is catalytically condensed in the pores of tube 3 is combusted by admission of fresh oxygen or air into chamber 4 by means of a suitable supply conduit 46 communicating therewith, the carbon having all been combusted at a selective temperature, i. e. above 1000 degrees F. in the primary combustion chamber 11.

The ultimate products of combustion are discharged from the apparatus through an outlet means 47 communicating with the secondary combustion chamber 4.

During the progress of the combustion the heat evolved in the primary combustion chamber 11 elevates the temperature to a point that is selective to the oxygenated combustion of the carbon of the hydrocarbon over the hydrogen contents and also facilitates the dissociation of the hydrocarbon into its free elements during the selective burning of the carbon while the heat is absorbed by the porous member 3 expanding and enlarging the openings or interstices therein and through which pass the carbon oxid by-products of combustion and hydrogen together with the nitrogen of air if air is employed as an oxygen carrier for combustion.

In passing through the pores of the member 3 the combustion heat is separated, absorbed and retained from the products of combustion by the associated solid constituents of the member 3 and in contact with the heat carrying combustion products, from which solid the heat is supplied or radiated for utilization in the various operations and for the various purposes desired.

The liberated and uncombined hydrogen passes out of the preliminary or primary combustion chamber 11 into and through the pores or interstices of the heat absorbing and porous member 3, by reason of peculiar attractive affinity for hydrogen or contact action of the heat absorbing porous member 3 which condenses the hydrogen therein and thereon to a degree that the hydrogen readily combines with such oxygen as remains in the depleted and stifling products of combustion and nitrogen content, thereby securing the heat equivalent which would otherwise be lost provided no further oxygen or air was supplied to the secondary combustion chamber 4, and this condensed hydrogen as it reaches the secondary combustion chamber 4 combusts with the fresh oxygen or oxygen of air supplied thereto or contained therein thereby liberating further heat all of which heat is finally utilized by supplying it to and through the fluid containing pipe, conduit, or reservoir 1 thus heating the fluid therein.

The heat is absorbed and gradually radiated to the object or material to be heated, by the solid heat retainer and radiator in contradistinction to and from the gaseous products of combustion of the prior art.

Referring to Figs. 3 and 4 the numeral 14 designates a shell or wall of a fluid container, such as a boiler for generating steam, which is closed by the removable top or cover 22 secured to the reservoir by bolts 24 passing through and securing it to the flange 23. Through the reservoir passes the heater tube 16 which is provided with the solid heat retainer and radiator 17 comprising porous material, such as clay and having the property of condensing or occluding hydrogen.

The combustible fluid is supplied to the heat generating device through the inner perforated tube or conduit 18 from whence it passes through the perforations or openings 21 into the primary or initial combustion chamber 20 where it is combusted at a high degree induced by the accumulation of heat by reflection back and forth from the surface of the porous member 17 and the outer surface of the perforated supply tube 18 impinging upon each and passing through the combusting gases elevating their temperature to that at which oxygen has a superior affinity for carbon over hydrogen, so that the carbon is combusted first liberating hydrogen, from a hydrocarbon, which is seized and condensed in and by the porous contact substance comprising the tube 17 and thus increased in gravity so that it more readily combines with any oxygen unconsumed by the carbon, regardless of the combustion stifling condition of the products of combustion associated with it, comprising as it does nitrogen and carbon dioxid, substantially, with only a small volume of oxygen and whereby more heat is secured and which heat is usually lost by the fugitive hydrogen passing up the flue and out of the chimney in ordinary cases of combustion. Oxygen or air is also introduced into the chamber 19 through inlet 48 to supply the fluid with oxygen for that which had previously been consumed in the initial combustion when desired. In all respects this adaptation of the invention corresponds to that involved in the operation of the plan illustrated in Figs. 1 and 2 except that in this former illustration the heat was generated and supplied to the fluid or other material or substance to be heated from the outside in an inward direction while in the plan shown in Figs. 3 and 4 the heat is delivered from the inside in an outward direction through or in contact with the fluid or other substance to be heated. The former being especially adapted for heating fluid, such as water, while the latter is especially adapted for producing high temperatures thereby producing steam which can be utilized for power purposes through suitable engines (not shown) or for other applications.

The heat produced within the heater is transmitted to the water or fluid 33 in the boiler or reservoir 14 through a solid heat conveying medium or vehicle comprising the porous heat retainer and hydrogen condenser 17.

The reverberating heat absorber or vehicle 17 serves to enhance the distribution of the heat as produced and concentrates the heat through its hydrogen condensing properties which induces combustion in gases containing oxygen in such limited proportions as to be non-available as a combustion factor ordinarily and therefore prevents losses of combustible fluids, such as hydrogen, and increases the heating utility by recovering the heat of combustion which is ordinarily lost. As before stated it is advisable to platinize the porous clay member 17 to augment its contact and condensing utility with reference to hydrogen. The ultimate combustion chamber 19 is provided with inlet means 48 for supplying oxygen or oxygen in a vehicle, such as air, and also with an outlet 49 for the products of combustion.

In the apparatus for carrying out the present process as illustrated diagrammatically in Figs. 1 and 3 it will be noted in referring to Fig. 1 that the combustible gas such as hydrocarbon or mixture thereof with limited quantities of air is introduced through the inlet 13 into the chamber 10 from whence it passes through the openings 12 in the wall 9 where it is partially combusted into the chamber 11 where further air is supplied thereto through the inlet 37 controlled by suitable valve, in which chamber 11 the temperature is suddenly elevated to above 1,000 degrees or the point at which carbon has a superior affinity for oxygen over hydrogen thereby liberating hydrogen from hydrocarbon by reason of deficiency of oxygen to combust both the carbon and hydrocarbon present the hydrogen being rapidly absorbed and conveyed through the porous catalytic or contact wall 3 passing therethrough where in its catalytically condensed state it is combusted by the oxygen or air introduced into chamber 4 through the inlet 46 controlled by suitable valve, the products of combustion passing out from chamber 4 through the outlet 47 controlled by suitable valve or chamber. In the initial combustion in chamber 11 prior to the elevation of the temperature to above 1,000 degrees it is advisable to allow the products of combustion in said chamber to escape through the outlet 38 controlled by suitable valve, and when the temperature has arisen to a point at or above 1,000 degrees where carbon has superior affinity for oxygen over hydrogen the valve in the outlet 38 is closed allowing the products of combustion to pass together with the hydrogen through the porous catalytic wall 3 and out through chamber 4 and outlet 47; this method of procedure is particularly adaptable for the heating of water from the exterior inward.

In cases where it is desired to heat water from the interior outward the means diagrammatically illustrated in Fig. 3 is preferable in which case water may be introduced into or discharged from the apparatus through the ducts 50 controlled by suitable valve and the steam generated may be conveyed through outlet 51 controlled by suitable valve 52 and the pressure controlled by relief valve 33 in the conduit 34. In the combustion as brought about in this form of apparatus shown in Fig. 3 the combustible ingredients are introduced through the inlet 18 controlled by suitable valve passing through the openings 21 into the chamber 20 which combustion is primarily induced and the temperature allowed to rise above 1,000 degrees or a point at which carbon has a superior affinity for oxygen over hydrogen of hydrocarbon up to which point products of combustion are allowed to escape through the outlet 36 controlled by suitable valve and after which the outlet 36 is closed and the products of combustion together with the hydrogen which is rapidly absorbed and condensed by the catalytic wall 17 pass therethrough into the secondary combustion chamber 19. During the combustion in chamber 20 oxygen or air is introduced through the inlet 35 controlled by suitable valve in which chamber the carbon is preferably consumed or oxidized and together with the hydrogen liberated passing into and through the wall 17 into the chamber 19 where the hydrogen is combusted by oxygen or air entering into the inlet 48 controlled by suitable valve the final products of combustion passing out of the secondary combustion chamber 19 through the discharge duct 49 controlled by suitable valve communicating therewith.

It is obvious that many other applications of the present invention than that for heating fluids interiorly or exteriorly as herein enumerated may be made without departing from the spirit of the invention, such as stoves, heaters, broilers, and all other apparatus or devices employing heat and where a larger yield of heat may be secured and applied in more economical manner and with better and more positive results than by the combustion means employed hitherto resulting in a saving of labor, fuel, time, and cost with correspondingly larger yields of product or other final result.

In Figs. 5 and 6 are shown different designs or plans for the purpose of illustrating or presenting a diagrammatic analysis of the transient steps or reactions involved in the complete combustion of a hydrocarbon, such a methane or substances containing the same like natural gas, in which the differing affinities of hydrogen and carbon for oxygen are distinguished by progressively changing reactions identified by steps or divided into stated lines of demarcation as the combustion proceeds.

Referring to Fig. 5 the various reactions involved in the complete combustion of hydrogen and carbon of a hydrocarbon, such as methane, are defined by steps illustrated as taking place or being performed in an apparatus provided with distinct and separate compartments or combustion chambers into which the methane is initially introduced into the lower combustion chamber 26 with just enough oxygen or vehicle containing the same, such as air, to combust two of the hydrogens from two volumes of methane or substantially comprising one volume of oxygen. The combustible fluid composition then passes into the porous outlet or burner 29 where it is ignited and being below 1000 degrees F. the hydrogen of the methane has a superior affinity for the oxygen and is, therefore, first consumed proportionately in preference to the carbon content, producing an equivalent of water and leaving the hydrogen-carbon radicals or methyls ($CH_3'$) having one free bond each to condense on each other and produce the next higher carbon-containing paraffin hydrocarbon ethane ($C_2H_6$) and evolving the heat equivalent of the hydrogen oxidized or combusted which elevates the temperature of the associated fluids in the combustion chamber 27 to a point at which carbon has a superior affinity for free oxygen over hydrogen, as they pass through the porous septum or diaphragm 29 into the secondary combustion chamber 27 where the condensed hydrocarbon, ethane generated in the combustion chamber 26 by partial combustion of the hydrogen of the methane primarily, is mixed with four volumes of oxygen or vehicle, such as air, containing the equivalent amount of oxygen necessary to combust the carbon in the ethane ($C_2H_6$), the gases being at a temperature at which the carbon has the superior affinity for free oxygen, this accomplished it produces two volumes of carbon dioxid and leaves as a combustible ingredient in the by-product six volumes of uncombusted hydrogen.

The heated products of combustion thus produced containing six volumes of uncombusted hydrogen pass through the porous septum or diaphragm 30 into the tertiary combustion chamber 28 where three volumes of oxygen or vehicle, such as air, containing the equivalent amount of oxygen is introduced and the final combustion of the six volumes of hydrogen is performed producing four volumes of water, and the ultimate products of combustion, viz., carbon dioxid and water pass out of the discharge opening 31 and through the conduit or flue 32, the heat produced being cumulated in the apparatus and blended into a uniform heat product. This illustration presumes the progressive oxidation or oxidative combustion of hydrocarbon by supplying progressively equivalents or oxygen to perform the various transient reactions at varying progressive points during the ultimate combustion and is given only as an illustration of what takes place during the progress of combustion to shown how the hydrogen is liberated, and, through its light gravity and fugitive and elusive nature is usually lost as a heat producing factor for the reason that it escapes with the products of combustion up the flue and out of the chimney and only burns, if at all, at the top of the chimney where it is not smothered by the excess of nitrogen, carbon dioxid and water vapor which may be represented in volume as

$$32N + 2CO_2 + 4H_2O$$

or out of reach of any point at which its heat equivalent can be secured and utilized, and therefore its heat utility is lost.

In the progressive combustion of hydrogen and carbon when an equivalent of oxygen or vehicle containing the same, such as air, is all initially introduced into or associated with the hydrocarbon and burned, instead of at progressive points for sectional combustion as described in connection with the diagrammic analytical plan shown in Fig. 5, a very different condition arises usually resulting in great loss of hydrogen and its corresponding heating equivalent for the reason as shown and illustrated in Fig. 6.

Fig. 6 is a diagrammatic illustration of progressive reactions entering into the complete combustion of methane and the difficulties met with in obtaining complete combustion of hydrocarbons and also obtaining the full heat equivalent, not only by reason of the loss by escape of fugitive and elusive hydrogen in the last instance, but because of the combustion stifling conditions of the associated products when the hydrogen gets a chance to unite with the oxygen which is left after the carbon is all consumed, for instance, considering the combustion occurring as represented in various steps by the circles shown in Fig. 6 at the left; seriatim in an ascending direction which are involved during the production of heat and its blending from the various reactions at the point represented by the single circle at the right, toward which all heat generated passes and at which all accumulates. Referring to this analytical diagram it will be noted that the combustion of the methane starts cold i. e. below 1000 degrees F. and at a temperature at which hydrogen has a superior affinity over carbon for free oxygen. Here is also illustrated the ultimate combustion of a mixture of methane and oxygen in proportion of two volumes of methane to eight volumes of oxygen, the oxygen being associated with thirty-two volumes of nitrogen or existing as ordinary air in proportion by volume of four of nitrogen to one of oxygen, as shown in the chemical formula at the right in Fig. 6, in which the nitrogen being inert is omitted.

The initial reaction consumes two volumes of hydrogen and produces an equivalent of water in elevating the temperature of the combusting ingredients to a temperature at which the oxygen has a superior affinity for carbon resulting in the production of an atmosphere comprising one volume of ethane associated with seven volumes of oxygen, thirty-two volumes of nitrogen and one volume of water.

In the next or second step in the combustion the temperature being selective to the combustion of carbon with free oxygen, the carbon of the ethane is consumed liberating hydrogen until the carbon is gone thereby producing carbon dioxid and resulting in an atmosphere comprising six volumes of hydrogen associated with three volumes of oxygen in a combustion stifling medium of thirty-two volumes of nitrogen, two volumes of carbon dioxide and one volume of water, which naturally nearly prevents the combustion of the hydrogen regardless of the fact that the hydrogen is striving to escape or fly away by reason of its light gravity and fugitive and elusive nature associated as it is with the heavier products of combustion and the further fact that it is still further reduced in its gravity by the expansive action of the heat on it. Hence it can be seen that it is almost impossible to obtain complete combustion of methane or hydrocarbon with air in or by the ordinary methods of combustion or the corresponding recovery of heat which should be produced in complete combustion at utilizable points or in a utilizable form.

The formula representing various combustion stages of the combustion transforming or converting ingredients, viz., carbon, hydrogen, and oxygen, are illustrated in the legend of Figs. 5 and 6 per se, omitting the nitrogen which is present in air and which is inert as to actual combustion and does not enter into the same, this is omitted to make the combustion illustration more clear and not complicated by foreign confusing inert diluents.

The present invention overcomes the difficulties met with in the prior art by associating with the combusting ingredients a substance or material which has such an affinity for hydrogen that it absorbs, abstracts and retains it from the surrounding ingredients and condenses it until combustion is induced by the limited amount of oxygen left in the large volume of combusted and non-combustible substances of combustion stifling nature after the carbon having the superior affinity for free oxygen induces the existing conditions of heat at the time at which the hydrogen gets a chance to combust.

As illustrative of the varying affinities of oxygen for hydrogen and carbon at varying temperatures reference is directed to the following chemical formulæ or equations in which (1) represents the reaction at a temperature at which hydrogen has the selective or superior affinity over carbon for free oxygen, i. e. below 1000 degrees F., while (2) represents the reaction which takes place at an elevated temperature or that at which carbon has the selective or superior affinity for oxygen over hydrogen, viz. above 1000 degrees F.:

(1)  $2CH_4 + 4O = 2C + 4H_2O$ (2)  $2CH_4 + 4O = 2CO_2 + 4H_2$

Complete combustion.  $2CH_4 + 8O = 2CO_2 + 4H_2O$

The above analytical reactions are given assuming that the temperature at (1) and (2) are so low and so high as to admit of the complete reaction at their selective temperatures, at points intermediate, however, where the affinities of hydrogen and carbon for oxygen strive for the mastery many intermediate products of partial combustion of complicated nature are produced in which oxygen becomes bonded to the hydrogen and carbon forming carbon, hydrogen, and oxygen containing compounds, such as formic aldehyde ($CH_2O$), etc., which stage it is unnecessary to discuss inasmuch as for the purpose of obtaining heat by combustion the formation of these products should be prohibited by conditions inducing the complete combustion of all the hydrogen and carbon into final products of oxidation, viz., carbon dioxid and water to obtain the full heat equivalent.

The various steps involved in the combustion of hydrocarbon with oxygen from the point at which hydrogen has the superior affinity for free oxygen to that at which carbon has the superior affinity, and the final combustion of the residual free hydrogen with the remaining oxygen may be represented by the following chemical formulæ or equations enumerated under (1), (2), and (3), the heat evolved during the performance of the reaction (1) elevates the temperature of the ingredients to that at which carbon has the superior or selective affinity for free oxygen and therefore induces the reaction set forth in (2):

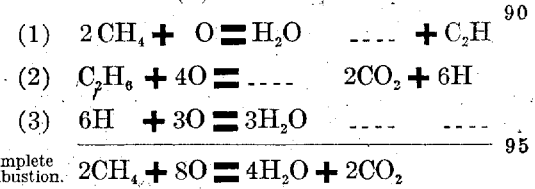

Complete combustion.  $2CH_4 + 8O = 4H_2O + 2CO_2$

As showing the depletion of oxygen in air during the process of combustion as performed at each stage enumerated and the difficulty experienced in combustion at each stage due to the increasing presence of non-combustible and combustion stifling gases such as nitrogen, carbon dioxid and water and particularly with reference to the condition at a time at which the hydrogen free has a chance to combust, the following chemical formulæ or equations are given:

Air comprises $4N + O$. Necessary to combust $2CH_4 = 32N + 8O$.

Stage (1) 8 air $32N + 8O$ minus $O = 32N + 7O + H_2O$

Stage (2) " " $32N + 7O$ " $4O = 32N + 3O + H_2O + 2CO_2$.

Stage (3) " " $32N + 3O$ " $3O = 32N + 4H_2O + 2CO_2$.

The condition of the atmosphere during the beginning of the combustion of each succeeding stage may be noted by referring to the underlined formulæ at the right of each preceding equation which constitutes the residual fluid product and associated inert fluids of the proceeding stage or step in the combustion procedure or process.

Gases being heat non-conductors the only available heat which can be secured from combustion gases is only from contacting hot gas or products of combustion with the heat abstracting material, such as metal of stoves or heaters and the like, and this is only accomplished in causing as much of the products of combustion to come in contact with the heated products as possible, the major part escaping in the body of the gaseous by-product unless passed through a heat absorber, scrubber or conducting gauze.

By combining contact action for attracting, securing, and condensing hydrogen, during the process of combustion with osmosis or dialysis induced through porous materials, hydrogen may be abstracted from carbon of hydrocarbon or from other carbonaceous substances and the separated ingredients combusted at selective places or points by reason of their being dialytically segregated. The absorption, condensation, or occlusion of the hydrogen by the porous contact acting material presents to combustion a hydrogen-containing or hydrogenated fuel of superior heating nature evolving large quantities of heat upon oxidative combustion with free oxygen or oxygen of an oxygen delivering agent. The combination of osmosis, catalysis and dialysis in the process of combustion actuated by and through a heat absorbing, retaining and delivering substance of non-combustible nature provides a fuel of progressively regenerative nature and superior heat delivering character. In this manner combustion may be carried on continuously and progressively and the various ingredients may be combusted simultaneously by providing various selective temperatures particularly adaptable to each and especially facilitated by dialysis of a porous non-conductor of heat. Some of the catalytic on contact substances adaptable to augment the action catalytically of the porous dializer and heat absorber and radiator are such substances as the oxid of iron, vanadium, chromium, manganese, etc., which may be associated with the dialytic heat abstracting and delivering combustion member. The contact action of some substances for hydrogen is so great that it has been calculated that the hydrogen gas must be actually solidified thereby and therein because of the percentage content present in the space occupied. This contact affinity or catalytic action also applies to oxygen as well as hydrogen whereby the combustion is further enhanced or facilitated.

By providing a plurality of combustion points, zones, or planes selective to the combustion of the various ingredients of the combustible fluid, the heat evolved and internally liberated throughout the body of fluid is so justified as to promote complete combustion and yield a uniformity of heat thereby providing a temperature control of the products of combustion and providing a means for checking and regulating the same so that losses through superheated gas or discharge of products of combustion is prevented, the separate or simultaneous combustions of ingredients being coöperative and co-active while the heat evolved is blended and unified. The concentrated combustion induced by the contact material provides an uncirculative and quiescent heat yielding medium actuated in such a manner that the heat evolved may be readily secured without loss and a uniformity of heat in the gases induced by impinging the combusting gases on the heat radiator in the combustion chamber. In some cases it is advisable to heat the combusting ingredients or fluids prior to combustion and especially in such cases where primary dissociation of ingredients such as hydrocarbon into free hydrogen and carbon are desired and this is also augmented by the progressively elevated temperature induced by the plurality of independent combusting materials. The contact or catalytic material employed may be of solid character and formed so as to render it applicable for many specific purposes such as shown at 3 Figs. 1 and 2 and 17 Figs. 3 and 4 or it may comprise broken or segregated parts or pieces of the material instead of in a body or mass provided in any event the material is suitably situated or located, and the material may comprise a contact or catalytic material per se or associated with other inert substances to increase the surface presented or otherwise augment the contact or catalytic action. It will be noted in the device illustrated for the purpose of setting forth the invention that the iron tube containing the fluid to be heated as shown at 1, in Figs. 1 and 2 is always in a reducing or non-oxidizing atmosphere which prevents the burning or destruction of the same as occurs in ordinary bare flame combustion operations or devices such as boilers or water heaters.

The term "thermode" employed herein is intended to imply a means as applied to heat generation and delivery corresponding to the term "electrode" employed in electricity, including a heat receiving and delivering character and device for augmenting the heat generation by contact action broadly and comprises specifically a substance having contact or catalytic action of such character as to seize, hold and condense hydrogen and oxygen and other combustible substances upon or within it and separate it or them from associated inert or uncombustible fluids, such as nitrogen, carbon dioxid, and water vapor, and perform a condensed combustion of the seized or separated combustible ingredients, simultaneously abstracting the heat evolved and delivering it to and at such points as desired for utilization. This thermode may also be of porous, dialytic, and catalytic nature, the osmotic properties of which may render it utilizable for separating the dense from the less dense associated fluids, such as hydrogen from hydrocarbon whereby each may be simultaneously and separately combusted at varying points and at selective temperatures to their individual combustion and the heat collected, blended and delivered by the thermode without interference, such as combusting hydrocarbon on one side of a porous dialytic diaphragm and hydrogen at the other side the same being passed through pores of the dialytic thermode from the combusting carbon side to the hydrogen combusting side during the process of combustion while the dialytic diaphragm acts in common as a thermode for collecting the heat liberated or evolved from each opposite reaction and delivering it from a common point in blended and unified form and in a simultaneous and progressive manner. In the operation of this arrangement the heat of one reaction may be employed to elevate the temperature to a selective point to actuate the combustion of the other. The porous tube or member shown at 3 Figs. 1 and 2 and 17 Figs. 3 and 4 constitutes at once a dialytic diaphragm of porous osmotic nature and contact or catalytic nature, in accordance with this specifically described procedure.

The term "combustion" relates to the combustion of elements of combustible substances whereby heat is evolved in contradistinction to and from endothermic or heat absorbing reactions of steam with oil whereby carbon is oxidized and hydrogen yielded in the production of oil-gas and the term "catalysis" relates to contact action of finely divided or porous substances of condensing or catalytic nature.

The term or expression "catalytically condensed" as employed herein is intended to imply and does imply a combustible substance, such as hydrogen, condensed by the absorption or attractive action of a catalytic or contact substance in such a manner that when the combustible is combusted the united energy of the condensed combustible substance, such as hydrogen, is evolved directly as if solid hydrogen were being combusted, and the supply of hydrogen or other combustible to the zone or sphere of combustion is supplied by substantially suction means induced by catalytic absorption or attraction of the contact substance from one direction while the catalytically condensed hydrogen or other combustible is being combusted at another point. It will be noted therefore that the supply of combustible through the medium of catalytic attraction or absorption is drawn to the combustion zone thereby in contradistinction to and from processes in the prior art which depend upon a draft or compression for supplying combustible ingredients to the sphere of combustion, and it will also be noted that in all cases of the prior art that the combustible ingredient is supplied to the zone of combustion associated with sufficient or excess of oxygen or oxygen delivering substance, such as air, to wholly combust the combustible ingredients so that there exists no combustible to be condensed as revealed in the present invention even if the combustion ingredients are associated with substances having catalytic nature. When combustion ingredients or combustibles associated with oxygen sufficient or in excess of that necessary to combine with the whole of the combustible are brought in contact with catalytic agents, sufficient heat is immediately produced to cause the ignition of the combustion mixture and thereafter the catalytic or contact substance acts only as an igniter and performs no other catalytic or contact action.

As a further illustration of a catalytic means of supplying a combustible in accordance with the present invention it will be noted that if the contact or catalytic substance employed comprises palladium which has the property of condensing or absorbing 600 times its volume of hydrogen, and hydrogen is the combustible substance employed, this hydrogen will be drawn from a reservoir by the catalytically condensing action of the paralladium, and if the condensed hydrogen is combusted at a point on the porous palladium containing substance opposite or away from the point of hydrogen supply, that the hydrogen combusts depleting the porous palladium of its hydrogen increasing the attractive affinity of the palladium for hydrogen at the point of supply and hence the combustion proceeds and the hydrogen supply is maintained catalytically as the products of combustion are discharged.

Having now described my invention what I claim as new and desire to secure by Letters Patent is:—

1. The process of securing heat energy from combustible fluid which comprises exposing a combustible fluid to ignition, progressively combusting the elemental constituents at selective temperatures and at different isolated points, securing and blending the heat evolved and discharging the products of combustion.

2. The process of securing heat energy from combustible fluid which comprises exposing a combustible fluid containing hydrogen to ignition, progressively combusting the elemental constituents at selective temperatures and at different isolated points, securing and blending the heat evolved and discharging the products of combustion.

3. The process of securing heat energy from combustible fluid which comprises exposing a combustible fluid containing hydrogen and carbon to ignition, progressively combusting the elemental constituents at selective temperatures and at different isolated points, securing and blending the heat evolved and discharging the products of combustion.

4. The process of securing heat energy from combustible fluid which comprises exposing a combustible fluid containing a hydrocarbon to ignition, progressively combusting the elemental constituents at selective temperatures and at different isolated points, securing and blending the heat evolved and discharging the products of combustion.

5. The process of securing heat energy from combustible fluid which comprises exposing a combustible fluid containing hydrogen and carbon to the action of heat capable of liberating hydrogen, progressively combusting the carbon and the hydrogen at selective temperatures and at different isolated points, securing and blending the heat evolved and discharging the products of combustion.

6. The process of securing heat energy from combustible fluid which comprises exposing a combustible fluid containing hydrocarbon to the action of heat capable of liberating hydrogen, progressively combusting the carbon and the hydrogen at selective temperatures at different isolated points, securing and blending the heat evolved and discharging the products of combustion.

7. The process of securing heat energy from combustible fluid which comprises exposing a combustible fluid to the action of heat capable of dissociating an ingredient therein, progressively combusting the resultant products at different isolated points, securing and blending the heat evolved and discharging the products of combustion.

8. The process of securing heat energy from combustible fluid which comprises exposing a combustible fluid to the action of heat capable of dissociating an ingredient therein, combusting one of the resultant products, retaining another against normal gravity and combusting the same, securing the heat evolved and discharging the products of combustion.

9. The process of securing heat energy from combustible fluid which comprises exposing a combustible fluid containing hydrogen and carbon to the action of heat capable of liberating hydrogen, retaining the hydrogen against normal gravity, combusting the carbon and combusting the hydrogen at different points, securing the heat evolved and discharging the products of combustion.

10. The process of securing heat energy from combustible fluid which comprises exposing a combustible fluid containing hydrocarbon to the action of heat capable of liberating hydrogen, retaining the hydrogen against normal gravity, combusting the carbon and combusting the hydrogen at different points, securing the heat evolved and discharging the products of combustion.

11. The process of securing heat energy from combustible fluid which comprises exposing a combustible fluid containing a hydrogen yielding compound to the action of heat capable of liberating hydrogen, retaining the hydrogen against normal gravity and finally combusting the same, securing the heat evolved and discharging the products of combustion.

12. The process of securing heat energy from combustible fluid which comprises condensing hydrogen by contact attracting and absorbing action and exposing it to the action of an oxygen delivering agent, securing the heat evolved and discharging the oxygenated product.

13. The process of securing heat energy from combustible fluid which comprises exposing catalytically condensed hydrogen to the action of an oxygen delivering agent, securing the heat evolved and discharging the oxygenated products.

14. The process of securing heat energy from combustible fluid which comprises progressively oxidizing carbon of hydrocarbon, condensing the hydrogen evolved, oxidizing said hydrogen, securing the heat evolved from both oxidations and discharging the combustion products.

15. The process of securing heat energy from combustible fluid which comprises progressively oxidizing carbon of hydrocarbon, condensing the hydrogen evolved by contact action, oxidizing said condensed hydrogen, securing the heat evolved from both oxidations and discharging the combustion products.

16. The process of securing heat energy from combustible fluid which comprises combusting hydrocarbon while maintained at a temperature at which oxygen has a superior affinity for carbon while in the presence of a hydrogen condensing agent and finally combusting the condensed hydrogen thus produced.

17. The process of securing heat energy from combustible fluid which comprises exposing a combustible fluid to the action of heat capable of dissociating an ingredient therein, combusting one of the resultant products, retaining another against normal gravity by contact action and combusting the same, securing the heat evolved and discharging the products of combustion.

18. The process of securing heat energy from combustible fluid which comprises exposing a combustible fluid containing hydrogen and carbon to the action of heat capable of liberating hydrogen, retaining the hydrogen against normal gravity by contact action, combusting the carbon, combusting the hydrogen, securing the heat evolved and discharging the products of combustion.

19. The process of securing heat energy from combustible fluid which comprises exposing a combustible fluid containing hydrocarbon to the action of heat capable of liberating hydrogen, retaining the hydrogen against normal gravity by contact action, combusting the carbon, combusting the hydrogen, securing the heat evolved and discharging the products of combustion.

20. The process of securing heat energy from combustible fluid which comprises exposing a combustible fluid containing a hydrogen yielding compound to the action of heat capable of liberating hydrogen, retaining the hydrogen against normal gravity by contact action, and finally combusting the same, securing the heat evolved and discharging the products of combustion.

21. The process of securing heat energy from combustible fluid which comprises condensing a combustible fluid in a thermode, combusting the same, securing the heat evolved, discharging the products of combustion, and supplying combustible to the combustion zone or sphere by suction induced by catalytic condensation or absorption.

22. The process of securing heat energy from combustible fluid which comprises catalytically charging a thermode with hydrogen by catalytic condensation or absorption, then combusting the same, securing the heat evolved, discharging the products of combustion, and supplying combustible to the combustion zone or sphere by suction induced by catalytic condensation or absorption.

23. The process of securing heat energy from combustible fluid which comprises combusting hydrogen of a catalytically hydrogenated thermode, securing the heat evolved, discharging the products of combustion, and supplying combustible to the combustion zone or sphere by suction induced by catalytic condensation or absorption.

24. The process of securing heat energy from combustible fluid, which comprises progressively condensing a combustible fluid in a thermode or thermodes, combusting the same, securing the heat energy evolved, discharging the products of combustion, and supplying combustible to the combustion zone, or sphere, by suction induced by catalytic condensation or absorption.

25. The process of securing heat energy from combustible fluid, which comprises progressively condensing hydrogen in a thermode or thermodes, combusting the hydrogen retained, securing the heat evolved, discharging the products of combustion, and supplying more hydrogen to the combustion zone or sphere by suction induced by catalytic condensation or absorption.

26. The process of securing heat energy from combustible fluid, which comprises progressively condensing hydrogen in a thermode or thermodes from a hydrogen-yielding substance, combusting the hydrogen retained, securing the heat evolved, discharging the products of combustion, and supplying more hydrogen-yielding substance to the combustion zone or sphere by suction induced by catalytic condensation or absorption.

27. The process of securing heat energy from combustible fluid which comprises progressively catalytically charging a thermode or thermodes with hydrogen from a hydrogen-carbon containing compound by catalytic attraction or absorption, combusting the hydrogen retained, securing the heat evolved, discharging the products of combustion, and supplying combustible to the combustion zone or sphere by suction induced by catalytic condensation or absorption.

28. The process of securing heat energy from combustible fluid which comprises progressively catalytically charging a thermode or thermodes with hydrogen from a hydrocarbon by catalytic attraction or absorption, combusting the hydrogen retained, securing the heat evolved, discharging the products of combustion, and supplying combustible to the combustion zone or sphere by suction induced by catalytic condensation or absorption.

29. The process of securing heat energy from combustible fluid, which comprises progressively condensing a combustible fluid in a thermode or thermodes by catalytic attraction or absorption during the process of combustion, combusting the same, securing the heat evolved, discharging the products of combustion, and supplying combustible to the combustion zone or sphere by suction induced by catalytic condensation or absorption.

30. The process of securing heat energy from combustible fluid which comprises progressively catalytically charging a thermode or thermodes with hydrogen during the process of combustion by catalytic attraction or absorption, combusting the hydrogen retained, securing the heat evolved, discharging the products of combustion, and supplying combustible to the combustion zone or sphere by suction induced by catalytic condensation or absorption.

31. The process of securing heat energy from combustible fluid, which comprises progressively condensing hydrogen from a hydrogen-yielding substance during the process of combustion, combusting the hydrogen retained, securing the heat evolved, discharging the products of combustion, and supplying more hydrogen from the hydrogen-yielding substance to the combustion zone or sphere by suction induced by catalytic condensation or absorption.

32. The process of securing heat energy from combustible fluid which comprises progressively catalytically charging a thermode or thermodes with hydrogen from a hydrogen-carbon containing compound during the process of combustion by catalytic attraction or absorption, combusting the hydrogen retained, securing the heat evolved, discharging the products of combustion, and supplying combustible to the combustion zone or sphere by suction induced by catalytic condensation or absorption.

33. The process of securing heat energy from combustible fluid which comprises progressively catalytically charging a thermode or thermodes with hydrogen from a hydrocarbon during the process of combustion by catalytic attraction or absorption, combusting the hydrogen retained, securing the heat evolved, discharging the products of combustion, and supplying combustible to the combustion zone or sphere by suction induced by catalytic condensation or absorption.

34. The process of securing heat energy from combustible fluid which comprises subjecting a combustible fluid to dialytic dissociation, then combusting the dialized products of differing density and the undialized residuum, securing the heat evolved, discharging the products of combustion, and supplying combustible to the combustion zone or sphere by suction induced by catalytic condensation or absorption.

35. The process of securing heat energy from combustible fluid which comprises subjecting a combustible fluid to dialytic dissociation during the process of combustion, then combusting the dialized products and the undialized residuum, securing the heat evolved, discharging the products of combustion, and supplying combustible to the combustion zone or sphere by suction induced by catalytic condensation or absorption.

36. The process of securing heat energy from combustible fluid which comprises subjecting an uncompressed combustible fluid to the dissociating action of a dialytic thermode, then combusting the products and educts thereof, securing the heat evolved, discharging the products of combustion, and supplying combustible to the combustion zone or sphere by suction induced by catalytic condensation or absorption.

37. The process of securing heat energy from combustible fluid which comprises subjecting an uncompressed combustible fluid to the dissociating action of a dialytic catalytic thermode, then combusting the products and educts thereof, securing the heat evolved, discharging the products of combustion, and supplying combustible to the combustion zone or sphere by suction induced by catalytic condensation or absorption.

38. The process of securing heat energy from combustible fluid which comprises subjecting an uncompressed combustible fluid to the dissociating action of a dialytic thermode during the process of combustion, then combusting the products and educts thereof, securing the heat evolved, discharging the products of combustion, and supplying combustible to the combustion zone or sphere by suction induced by catalytic condensation or absorption.

39. The process of securing heat energy from combustible fluid which comprises subjecting an uncompressed combustible fluid to the dissociating action of a dialytic catalytic thermode during the process of combustion, then combusting the products and educts thereof, securing the heat evolved, discharging the products of combustion, and supplying combustible to the combustion zone or sphere by suction induced by catalytic condensation or absorption.

40. The process of securing heat energy from combustible fluid which comprises subjecting a heated combustible fluid to osmosis and catalysis, combusting the products and educts thereof at different isolated points, securing the heat evolved and discharging the products of combustion.

41. The process of securing heat energy from combustible fluid which comprises subjecting a combustible fluid to osmosis, combusting the products and educts thereof at different isolated points, securing the heat evolved and discharging the products of combustion.

42. The process of securing heat energy from combustible fluid which comprises subjecting an uncompressed combustible fluid to dissociating osmosis and catalysis during the process of combustion, then combusting the products and educts thereof, securing the heat evolved, discharging the products of combustion.

43. The process of securing heat energy from combustible fluid which comprises subjecting an uncompressed combustible fluid to dissociating osmosis during the process of combustion, then combusting the products and educts thereof, securing the heat evolved, discharging the products of combustion.

44. The process of securing heat energy from combustible fluid which comprises exposing a combustible fluid to ignition, progressively combusting the elemental constituents at selective temperatures and at different isolated points, securing and blending the heat evolved through the medium of a solid heat conveyer associated with the combusting ingredients and discharging the products of combustion.

45. The process of securing heat energy from combustible fluid which comprises exposing a combustible fluid to ignition, progressively combusting the elemental constituents at selective temperatures and at different isolated points, securing and blending the heat evolved by the action of a porous solid heat conveyer associated with the combusting ingredients and discharging the products of combustion.

46. The process of securing heat energy from combustible fluid which comprises combusting a combustible fluid containing carbon and a less dense ingredient while maintaining a temperature at which oxygen has a superior affinity for carbon, retaining the less dense ingredient against normal gravity, securing the heat evolved and discharging the products of combustion.

47. The process of securing heat energy from combustible fluid which comprises combusting a combustible fluid containing carbon and a less dense ingredient while maintaining a temperature at which oxygen has a superior affinity for carbon, retaining the less dense ingredient against normal gravity by contact action, securing the heat evolved and discharging the products of combustion.

48. The process of securing heat energy from combustible fluid which comprises combusting a combustible fluid containing carbon and hydrogen while maintaining a temperature at which oxygen has a superior affinity for carbon, retaining the hydrogen against normal gravity, securing the heat evolved and discharging the products of combustion.

49. The process of securing heat energy from combustible fluid which comprises combusting a combustible fluid containing carbon and hydrogen while maintaining a temperature at which oxygen has a superior affinity for carbon, retaining the hydrogen against normal gravity by contact action, securing the heat evolved and discharging the products of combustion.

50. The process of securing heat energy from combustible fluid which comprises combusting a combustible fluid containing hydrocarbon while maintaining a temperature at which oxygen has a superior affinity for carbon, retaining the hydrogen against normal gravity, securing the heat evolved and discharging the products of combustion.

51. The process of securing heat energy from combustible fluid which comprises combusting a combustible fluid containing hydrocarbon while maintaining a temperature at which oxygen has a superior affinity for carbon, retaining the hydrogen against normal gravity by contact action, securing the heat evolved and discharging the products of combustion.

52. The process of securing heat energy from combustible fluid which comprises progressively catalytically condensing a fluid and combusting the same in such condensed state, and supplying combustible thereto by suction induced by catalytic condensation or absorption.

53. The process of securing heat energy from combustible fluid which comprises progressively catalytically condensing a fluid, combusting the same in such condensed state, and supplying combustible fluid to the catalytically condensing zone or sphere, and supplying combustible thereto by suction induced by catalytic condensation or absorption.

54. The process of securing heat energy from hydrogen which comprises progressively catalytically condensing hydrogen and combusting the same in such condensed state, and supplying hydrogen thereto by suction induced by catalytic condensation or absorption.

55. The process of securing heat energy from hydrogen which comprises progressively catalytically condensing hydrogen, combusting the same in such condensed state, and supplying hydrogen to the catalytically condensing zone or sphere, and supplying hydrogen thereto by suction induced by catalytic condensation or absorption.

56. In the process of securing heat energy from combustible fluid, the step of performing a separated combustion of constituents differing in gravity and catalytic affinity, which comprises subjecting the fluid to the combined and coöperating action of a catalytic substance associated with a substance comprising osmodic dialyzing properties selective to the passage through the same of the catalyzed and catalytically condensed constituent to the retarding of the other, combusting each at points separated thereby and progressively supplying the fluid combustible to be separated and combusted.

In testimony whereof I affix my signature in presence of two witnesses.

ROBERT GILMOUR FINLAY.

Witnesses:
HERBERT R. BRANCH,
THEODORE M. BRANCH.